(12) United States Patent
Liang (10) Patent No.: US 7,958,535 B2
(45) Date of Patent: *Jun. 7, 2011

(54) URI POINTER SYSTEM AND METHOD FOR THE CARRIAGE OF MPEG-4 DATA IN AN MPEG-2 TRANSPORT STREAM

(75) Inventor: Kai-Chieh Liang, Huntington Beach, CA (US)

(73) Assignee: Sharp Laboratories of America, Inc., Camas, WA (US)

( * ) Notice: Subject to any disclaimer, the term of this patent is extended or adjusted under 35 U.S.C. 154(b) by 2856 days.

This patent is subject to a terminal disclaimer.

(21) Appl. No.: 10/670,949

(22) Filed: Sep. 25, 2003

(65) Prior Publication Data

US 2005/0081143 A1    Apr. 14, 2005

(51) Int. Cl.
*H04N 7/173* (2006.01)
(52) U.S. Cl. .......................... 725/113; 715/513
(58) Field of Classification Search ............... 725/32, 725/112, 131; 715/513, 744; 709/218, 219
See application file for complete search history.

(56) References Cited

U.S. PATENT DOCUMENTS

| | | | |
|---|---|---|---|
| 6,377,309 B1* | 4/2002 | Ito et al. ...................... | 348/554 |
| 2002/0124263 A1* | 9/2002 | Yokomizo ..................... | 725/112 |
| 2002/0133827 A1 | 9/2002 | Newnam et al. ............... | 725/89 |
| 2005/0081143 A1* | 4/2005 | Liang .......................... | 715/513 |

FOREIGN PATENT DOCUMENTS

| | | |
|---|---|---|
| EP | 1 009 140 A2 | 12/1999 |
| EP | 1045564 A1 * | 10/2000 |
| JP | 2003143585 | 5/2003 |
| WO | WO 99/39272 | 8/1999 |

OTHER PUBLICATIONS

Carten Herpel, Elementary Stream Management in MPEG-4, Mar. 1999, IEEE.*
European Search Report—04022529.4-2223.
Kenjiro Kai and Tadashi Isobe, "2-3 Data Encoded Method", Image Information Media Society's Magazine, Nov. 20, 1998, vol. 52, No. 11.
Kenjiro Kai and Tadashi, "2-3 Data Encoded Method".

* cited by examiner

*Primary Examiner* — Scott Beliveau
*Assistant Examiner* — Alan Luong
(74) *Attorney, Agent, or Firm* — Law Office of Gerald Maliszewski; Gerald Maliszewski (57) ABSTRACT

A uniform resource indicator (URI) pointer system and method are provided for retrieving MPEG-4 data pointers in an MPEG-2 TS. The method comprises: receiving an MPEG-2 TS; locating a URI in the TS; in response to the URI, accessing an address; in response to accessing the address, retrieving MPEG-4 resources; and, decoding the MPEG-4 resources. The URI pointer can be a local cache address, a Web protocol identifier (such as http), and/or a local identifier (lid). In some aspects, the MPEG-2 TS may include MPEG-4 resources organized in an Object Carousal (OC) transport protocol. Then, lid URIs provide a binding name and access scheme to the objects in the OC. For example, a lid URI may be embedded in an Initial Object Descriptor (IOD) to locate resources in the OC such as a binary format for scenes (BIFS) scene description stream and/or an object descriptor stream.

34 Claims, 6 Drawing Sheets

URI POINTER SYSTEM AND METHOD FOR THE CARRIAGE OF MPEG-4 DATA IN AN MPEG-2 TRANSPORT STREAM

BACKGROUND OF THE INVENTION

1. Field of the Invention

This invention generally relates to digital image and data transport processes and, more particularly, to a uniform resource indicator (URI) system and method for carrying MPEG-4 data in an MPEG-2 transport stream (TS).

2. Description of the Related Art

Most of the digital video broadcasting systems, such as European Digital Video Broadcasting (DVB) and American Advanced Television Systems Committee (ATSC), are based on the common MPEG-2 coding systems. MPEG-2 offers features such as high-definition video, multiple-channel audio, and even the exciting new multimedia data and interactive services.

Meanwhile, ISO and IEC have jointly developed ISO/IEC 14496 MPEG-4 as the next generation audiovisual standard. MPEG-4 provides better compression efficiency than MPEG-2 and new features such as audiovisual interactivities, Copyright Protection, and other features that can enhance digital television broadcasting and enable new applications. The harmonization between MPEG-2 based broadcasting standards, such as DVB, and MPEG-4 technologies is important for the enhancement of future digital television broadcasting. The harmonization of the MPEG-2 broadcasting and MPEG-4 standards must include the harmonization of layers, such as transport layer and application layer.

Transport layer harmonization is the foundation of this effort. Specifically, a means must be found to enable the carriage of MPEG-4 data elements, including scenes and associated streams, by the MPEG-2 broadcasting specified transport layer protocols. The MPEG-2 broadcasting system, such as Europe DVB or American ATSC, has defined transport protocols including MPEG-2 Transport Stream, DSM-CC Data Carousel, DSM-CC User-to-User (U-U) Object Carousel, and Internet Protocol, to name a few. MPEG-2 Transport Stream is the foundation layer for most of the other protocols. Thus, carriage of MPEG-4 data using MPEG-2 transport is an important issue to solve.

ISO/IEC has specified the method for carriage of MPEG-4 content on MPEG-2 transport stream (known as 4on2) in the specification of ISO/IEC 13818-1. MPEG-4 contents consist of an initial object descriptor and a variable number of streams, such as object descriptor stream, scene description streams, audio streams, video streams, IPMP streams, etc. The specification (ISO/IEC 13818-1) requires that each of the MPEG-4 streams be contained in an SL-packetized stream and may optionally be multiplexed into a FlexMux stream, both defined in ISO/IEC 14496-1. The SL-packetized streams or FlexMux streams are then encapsulated either in MPEG-2 Packetized Elementary Stream (PES) packets or in ISO_IEC_14496_sections prior to Transport Stream packetization and multiplexing.

ISO/IEC 13818-1 specifies the encapsulation and signaling approaches for the ISO/IEC 14496 audiovisual scenes and associated streams carried in ISO/IEC 13818-1 transport stream. The procedure is summarized as follows:

MPEG-4 content associated with a program carried in the transport stream shall be referenced in the Program Map Table of that program. Program Map Table is shown in Table 1.

An initial object descriptor (IOD) shall be used to define the ISO/IEC 14496-1 scene. The initial object descriptor, which serves as the initial access point to all associated MPEG-4 streams, shall be conveyed in the IOD descriptor located in the descriptor loop immediately following the program_info_length field in the Program Map Table of the program to which the scene is associated.

The IOD contains ES_Descriptors identifying the scene description and object descriptor streams that form the program. It may also contain ES_Descriptors identifying one or more associated IPMP or OCI streams, for example.

Elements of ISO/IEC 14496 content may be conveyed in one or more ISO/IEC 13818-1 MPEG-2 program elements referenced by a unique PID value within a Transport Stream.

Carriage of ISO/IEC 14496 content in a PID is signaled by a stream_type value of 0x12 or 0x13 in the Program Map Table in association with that PID value.

The SL descriptor and the FMC descriptor shall be used to specify the ES_ID for each encapsulated ISO/IEC 14496 stream.

TABLE 1

Transport Stream program map section

| Syntax | No. of bits | Mnemonic |
|---|---|---|
| TS_program_map_section( ) { | | |
|     table_id | 8 | uimsbf |
|     section_syntax_indicator | 1 | bslbf |
|     '0' | 1 | bslbf |
|     reserved | 2 | bslbf |
|     section_length | 12 | uimsbf |
|     program_number | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     reserved | 3 | bslbf |
|     PCR_PID | 13 | uimsbf |
|     reserved | 4 | bslbf |
|     program_info_length | 12 | uimsbf |
|     for (i = 0; i < N; i++) { | | |
|         descriptor( ) | | |
|     } | | |
|     for (i = 0; i < N1; I++) { | | |
|         stream_type | 8 | uimsbf |
|         reserved | 3 | bslbf |
|         elementary_PID | 13 | uimsbf |
|         reserved | 4 | bslbf |
|         ES_info_length | 12 | uimsbf |
|         for (i = 0; I < N2; i++) { | | |
|             descriptor( ) | | |
|         } | | |
|     } | | |
|     CRC_32 | 32 | rpchof |
| } | | |

Figure 1:
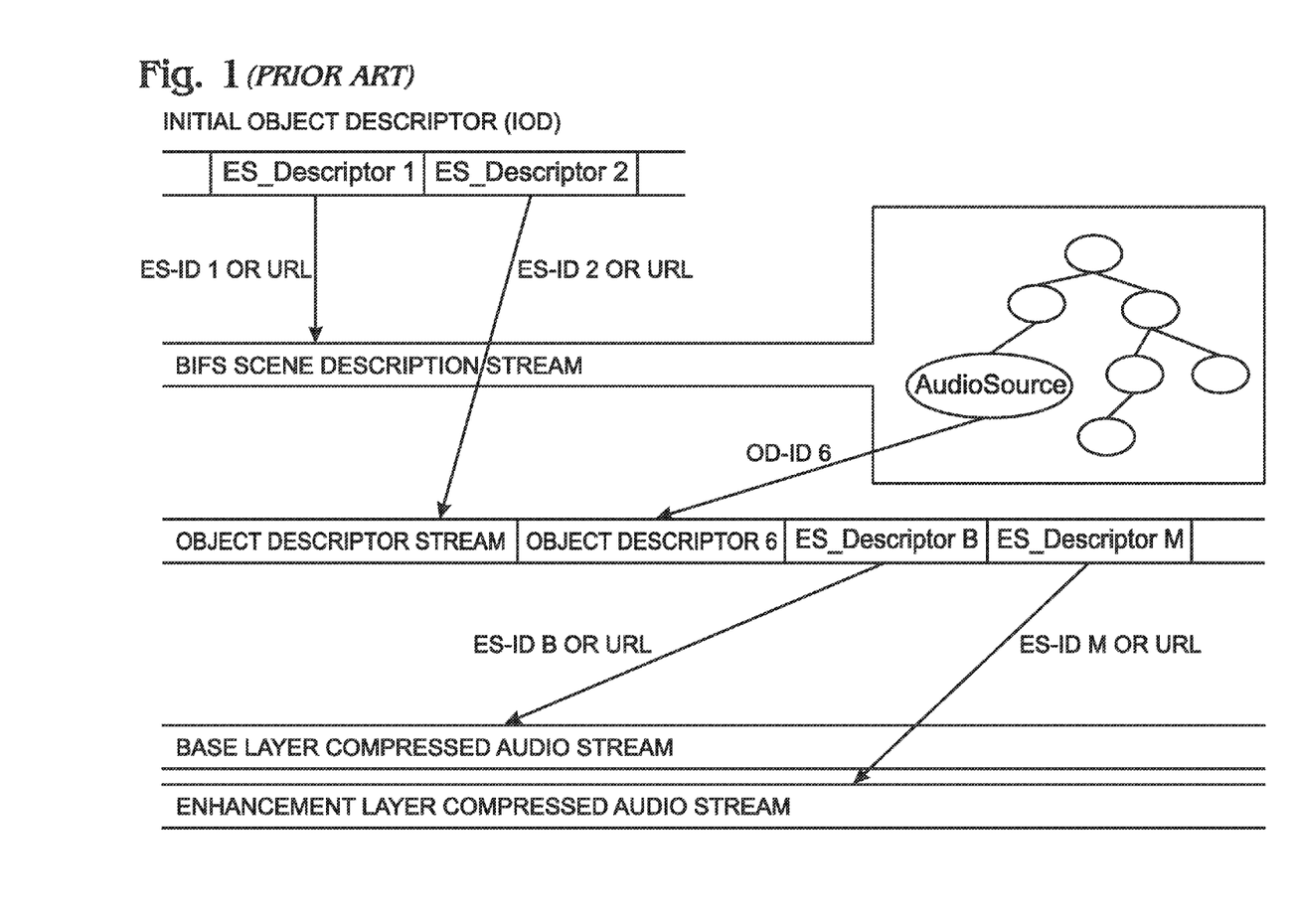
FIG. 1 is a diagram illustrating procedures for playing MPEG-4 content (prior art).

FIG. 1 is a diagram illustrating procedures for playing MPEG-4 content (prior art). Following the specification of ISO/IEC 13818-1, the procedures for playing MPEG-4 content received from a 13818-1 transport, as described above, is described as follows:

1. Obtain the initial object descriptor (IOD), which contains the ES_Descriptors for the BIFS scene stream, object descriptor streams, etc.
2. The BIFS ES_Descriptor contains the ES_ID and an optional Universal Resource Locator (URL) for the BIFS stream to retrieve. Accordingly, there are two ways to retrieve the BIFS streams:
   a. Use the ES_ID, which serves as a unique label for the elementary stream within its name scope, and the SL_Descriptor, which contains the PID for the ES_ID. The BIFS stream can be retrieved from the packets associated with the PID.

b. Alternatively, if the ES_Descriptor contains an URL, the BIFS stream can be retrieved from the location specified by the URL. The retrieved stream is then associated with the ES_ID.

3. Repeat Step 2 for the object descriptor stream.
4. Compose the BIFS scene using the retrieved BIFS stream.
5. Some BIFS nodes are associated to the corresponding elementary streams resources via object descriptors. The association is established by means of the objectDescriptrorID in the object descriptor.
   a. Use the objectDescriptorID to locate the object descriptor in the object descriptor stream.
   b. The object descriptor shall contain the ES_Descriptor for the elementary stream.

Repeat Step 2, i.e. use the ES_ID or URL, to retrieve the elementary stream.

Due to the complexity of the specified ISO/IEC methodology, there is not yet a valid and complete implementation available up to date, especially for the carriage of MPEG-4 Systems on the MPEG-2 transport. Thus, there is a need to define a new method for delivery of MPEG-4 content based upon MPEG-2 transport protocols.

It would be advantageous if a means could be developed for carrying MPEG-4 data in an MPEG-2 TS using existing MPEG-2 methodologies.

It would be advantageous if the above-mentioned methodologies were compliant with existing MPEG-2 and MPEG-4 standards.

SUMMARY OF THE INVENTION

The present invention defines a new method for the carriage of MPEG-4 data in an MPEG-2 TS based upon uniform reference indicator URI and a transport file Object Carousel. The Object Carousel (OC) is one of the important transports used in MPEG-2 broadcasting. While a uniform reference locator (URL) reference is defined in the ISO/IEC 13818-1 specification as an alternative approach for transmitting MPEG-4 data, no specific means for using an URL is defined in the specification. This invention defines the means and proposes a solution fully compliant with the ISO/IEC 13818-1 standard. The solution is flexible and effective in downloading and associating the MPEG-4 components in a MPEG-2 broadcasting infrastructure. Furthermore, the original ISO/IEC method and the newly invented method can be used simultaneously. The receiver can also choose to cache the downloaded data to speed up the acquisition process and improve the reuse of data.

In a summary, the present invention harmonizes the MPEG-2 and MPEG-4 standards, enabling an approach to carry MPEG-4 data, including scenes and associated streams, using the MPEG-2 OC transport protocol.

Accordingly, a URI pointer method is provided for retrieving MPEG-4 data pointers in an MPEG-2 TS. The method comprises: receiving an MPEG-2 TS; locating a URI in the TS; in response to the URI, accessing an address; in response to accessing the address, retrieving MPEG-4 resources; and, decoding the MPEG-4 resources. The URI can be a local cache address, a Web protocol identifier (such as http), and/or a local identifier (lid).

In some aspects of the method, the MPEG-2 TS is embedded with MPEG-4 resources. If so, the MPEG-4 resources organized in an Object Carousal (OC) transport protocol. Then, a lid URI is retrieved from the MPEG-2 TS, and MPEG-4 resources are retrieved from the MPEG-2 TS in response to accessing the lid URI. The lid URIs provide a binding name and access scheme to the objects in the OC. For example, a lid URI may be embedded in an Initial Object Descriptor (IOD) to locate resources in the OC such as a binary format for scenes (BIFS) scene description stream and/or an object descriptor stream.

Additional details of the above-described method, and a receiver and broadcaster using a URI pointer system for accessing pointers to MPEG-4 data in an MPEG-2 TS are provided below.

DETAILED DESCRIPTION OF THE PREFERRED EMBODIMENTS

Figure 2:
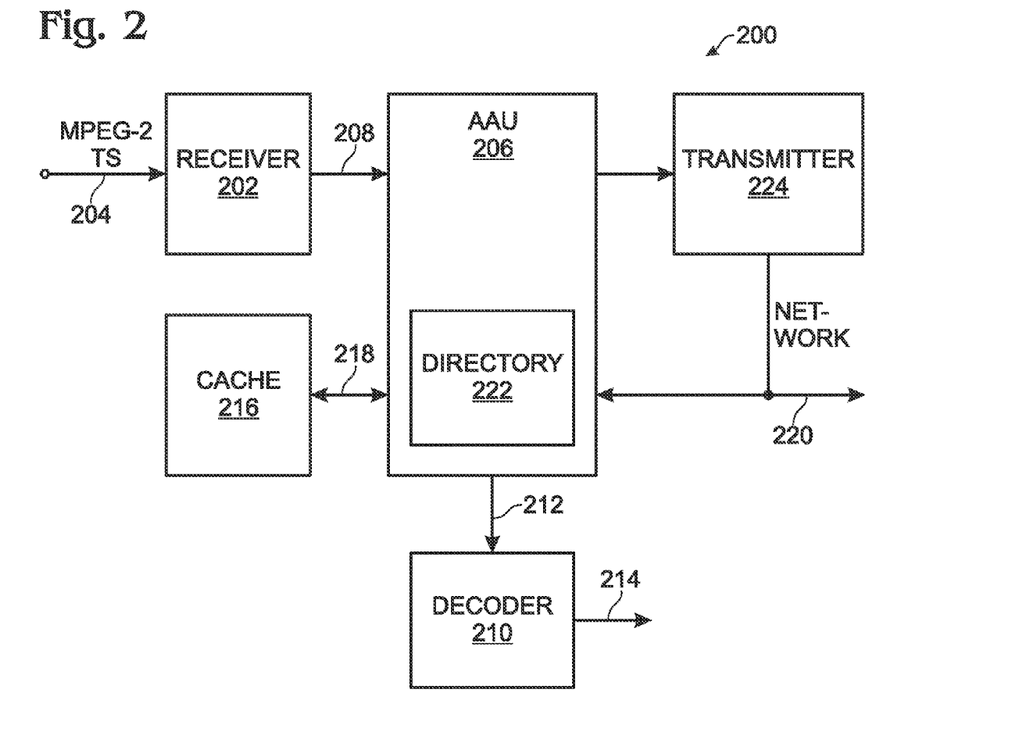
FIG. 2 is a schematic block diagram of the present invention URI pointer system for accessing pointers to MPEG-4 data from an MPEG-2 TS, in a receiver for decoding MPEG-4 data.

FIG. 2 is a schematic block diagram of the present invention URI pointer system for accessing pointers to MPEG-4 data from an MPEG-2 TS, in a receiver for decoding MPEG-4 data. The system 200 comprises a receiver 202 having an interface on line 204 for accepting an MPEG-2 TS. The receiver 202 may be used to strip the MPEG-2 TS from a carrier and provide a demodulated MPEG-2 TS. An address access unit 206 has an interface to accept the MPEG-2 TS from the receiver on line 208. The address access unit 206 locates a URI in the TS, accesses an address, and retrieves MPEG-4 resources.

A decoder 210, having an interface, is connected to the address access unit 206 on line 212 for receiving the MPEG-4 resources. The decoder 210 supplies decoded the MPEG-4 resources on line 214. The decoder 210 supplies MPEG-4 resources such as audio, video, and/or systems data. As prescribed in the MPEG-4 specification, systems data is the information used for constructing the communication of interactive audiovisual scenes. This includes the MPEG-4 terminal model, a coded representation of interactive audiovisual scene (BIFS), synchronization and multiplexing information, to name but a few examples. That is, the decoder 210 may supply resources such as enhanced audio data in the MPEG-2 TS, enhanced video data in the MPEG-2 TS, and/or systems data to establish an interactive audiovisual scene and communication link.

Some aspects of the system 200 include a local cache mechanism 216 connected to the address access unit 206

(AAU) on line 218. In other aspects, the AAU 206 is connected to a network, represented by line 220, that supports Internet Protocol (IP) communications, http communications, and the like. The address access unit 206 may locate different kind of URIs, to sources such as a local cache address, a Web protocol identifier, such as ftp or http, and/or a local identifier (lid). URIs can be used to identify various points of content, such as a page of text, a video or sound clip, a still or animated image, or a particular a MPEG-4 resource. The most common form of URI is the Web page address (e.g. an http address), which is a particular form or subset of URI called a Uniform Resource Locator (URL). In this invention, we use a local identifier (lid) URI, which is defined in SMPTE 343M-2002, for referencing resources in a broadcast transport.

In some aspects, the address access unit 206 receives an MPEG-2 TS embedded with MPEG-4 resources. The AAU 206 uses lid URIs retrieved from the MPEG-2 TS to retrieve MPEG-4 resources from the MPEG-2 TS. More specifically, the MPEG-4 resources are organized in Object Carousal (OC) transport protocol.

In some aspects, the address access unit 206 includes a directory 222. The address access unit accepts the transport file, builds an OC in the directory 222, and uses lid URIs to provide a binding name and access scheme to the objects in the OC. Typically, the AAU 206 builds an OC hierarchical directory 222 that may include a root directory, sub-directories, files, and streams.

Figure 3:
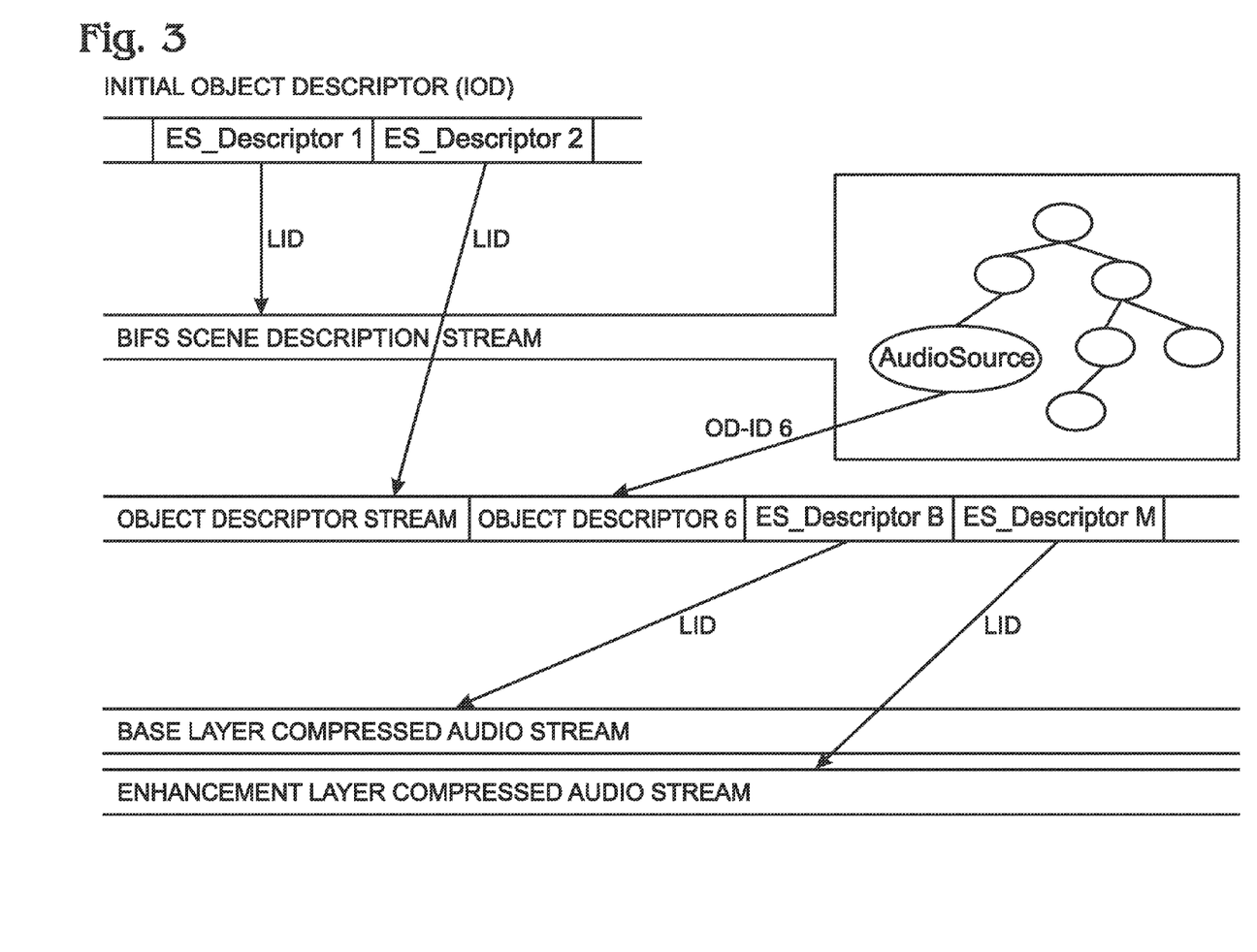
FIG. 3 is a diagram depicting a procedure for accessing MPEG-4 resources using lid URIs.

FIG. 3 is a diagram depicting a procedure for accessing MPEG-4 resources using lid URIs. For example, the address access unit (206, FIG. 2) may use a lid URI embedded in an Initial Object Descriptor (IOD) to locate resources in the OC selected from the group including a BIFS scene description stream and an object descriptor stream.

In other aspects of the system 200 of FIG. 2, the address access unit receives a first MPEG-2 TS and a second MPEG-2 TS. The AAU 206 retrieves a lid URI in the first MPEG-2 TS, and uses the lid URI to retrieve MPEG-4 resources from the second MPEG-2 TS. In other aspects, a lid URI in a first MPEG-2 TS can identify MPEG-4 resources in a plurality of other MPEG-2 TSs. Note, the MPEG-2 TSs need not be received (or transmitted) simultaneously.

In some aspects, the AAU may use the local cache mechanism 216 to store the OC hierarchical directory. Then, in subsequent portions of the MPEG-2 TS, or in other TSs, the address access unit 206 may uses lid URIs to retrieve MPEG-4 resources from the OC hierarchical directory in cache 216. Processing resources can be conserved if the AAU 206 does not have to build the entire OC in directory 222, every time new OC data is received in a TS.

In some aspects, the system 200 further comprises a transmitter 224 connected to an interactive return channel to send MPEG-4 information. The interactive return channel is shown connected to network 220. Then, an interactive communication link, including the transmitter 224 and receiver 202 is formed, in response to decoding the MPEG-4 system data, sending and receiving MPEG-4 information.

Figure 4:
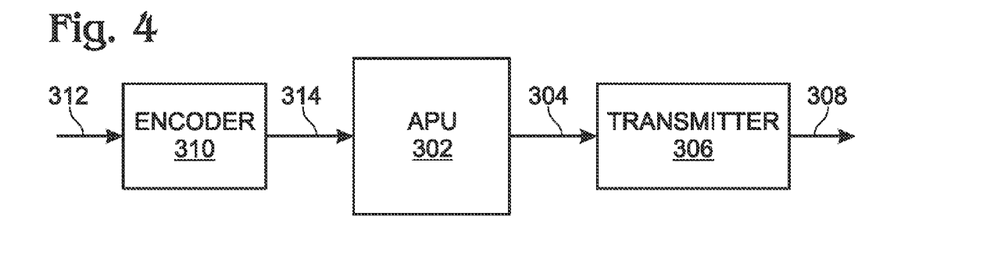
FIG. 4 is a schematic block diagram of the present invention URI pointer system for supplying an MPEG-2 transport stream (TS) with pointers for accessing MPEG-4 data, in an MPEG-4 broadcaster.

FIG. 4 is a schematic block diagram of the present invention URI pointer system for supplying an MPEG-2 transport stream (TS) with URIs for accessing MPEG-4 data, in an MPEG-4 broadcaster. The system 300 comprises an address pointer unit (APU) 302 having an interface on line 304 to supply an MPEG-2 TS with URIs for accessing MPEG-4 resources. The URIs may reference MPEG-4 resources such as audio, video, and/or systems data. That is, the MPEG-4 resources may enhance audio and/or video data in the MPEG-2 TS, and/or be systems data that can be used for the establishment of an interactive audiovisual scene and communication link.

When the URI are formed, they are embedded into an MPEG-2 TS. These formed URIs are used to construct the MPEG-4 system. An MPEG-4 system may also include an interactive scene with all kinds of pointers, such as URIs, to various audio/video/graphic objects (resources). The URI can reference resources (audio, video, system data) already in the cache embedded in the broadcast transport using OC, or located at a remote site.

A codec system usually includes the system data, video, and audio resources. In MPEG-4, the systems data part is used to build up an interactive audiovisual scene. The scene consists of many objects (of different shapes) such as audio, video, graphics, html, etc. An example is a house scene consisting of a sofa object, chair objects, table object, etc. An MPEG-4 system is needed even if the scene includes only 1 object. As the MPEG-4 system is used to build an interactive scene.

A transmitter 306 has an interface to accept the MPEG-2 TS on line 304 from the address pointer unit and an interface to broadcast the MPEG-2 TS on line 308. The transmitter 306 embeds the MPEG-2 TS in a digital wrapper carrier for example, or otherwise creates a TS carrier. For example, line 308 can represent a satellite, cable, or conventional over-the-air broadcast medium. The address pointer unit 302 generates a URI that can be a local (receiver) cache address, a Web protocol identifier (such as ftp or http), and/or a lid URI.

In some aspects, the system 300 further comprises an encoder 310 having an interface on line 312 to accept MPEG-4 information and an interface on line 314 to supply encoded MPEG-4 resources. The address pointer unit 302 accepts the encoded MPEG-4 resources, embeds the encoded MPEG-4 resources in the MPEG-2 TS, and generates URIs for the MPEG-4 resources embedded in the MPEG-2 TS, and/or stored at a remote site.

To continue, the address pointer unit 302 organizes MPEG-4 resources in the MPEG-2 TS using an Object Carousal transport protocol. More specifically, the address pointer 302 unit uses lid URIs to provide a binding name and access scheme to the objects in the OC. For example, the address pointer unit 302 may use a lid URI embedded in an IOD to locate resources in the OC selected from the group including a BIFS scene description stream and an object descriptor stream. Typically, the OC system is a hierarchical directory structure that includes a root directory, sub-directories, files, and streams.

In another aspect, the address pointer unit 302 forms a lid URI in a first MPEG-2 TS and embeds MPEG-4 resources in a second MPEG-2 TS. Then, the transmitter 306 broadcasts the first and second MPEG-2 TSs. At the receiver-side, the URI in the first TS can be used to retrieve resources from the second TS.

Functional Description

Returning to FIG. 3, although not shown, it should be noted that an object descriptor may have an optional URI (for example, a lid address) pointing to another object descriptor elsewhere. The new object descriptor would be referenced and associated with the objectDescriptorID of the original object descriptor carrying the URI string. The technique is applicable to both elementary stream and object descriptor.

As explained above, the two MPEG-4 standard-compliant approaches for retrieving elementary streams are: (1) via the ES_ID and the associated PID for the data carried in the transport packets; and, (2) via URI to reference streams carried elsewhere, such as over an IP network. The present invention defines a URI pointer means complaint with the ISO/IEC 13818-1 specification. The invention uses an Object Carousel to deliver MPEG-4 program elements in an organized set and forms a transport file system. One example of an OC is the DSM-CC OC. The invention associates a unique label (URI address) for each of the MPEG-4 resource being transmitted in the file system. Then, the URI address (pointer) and the file structure are used to retrieve the transmitted MPEG-4 elements.

ISO/IEC 13818-6 DSM-CC U-U Object Carousel is one of the transport protocols specified for use with MPEG-2 broadcasting systems such as DVB-MHP. It provides a standard mechanism to transmit a collection of U-U Objects (e.g. directories, files, streams, etc) in a broadcast network. The set of U-U Objects jointly form a hierarchical transport file system, which is used in this invention as the method to deliver the MPEG-4 data, such as scenes and/or streams, in an MPEG-2 network.

Each instance of a U-U Object Carousel represents a particular Service Domain and is uniquely identified by an identifier called Carousel NSAP address (as defined in the ISO/IEC 13818-6 specification). Each Service Domain has a Service Gateway to provide the root Directory of the file system. To support such a Service Domain, DSM-CC uses a protocol called Broadcast Inter-ORB Protocol (BIOP), which consists of three important parts as the follows:

- BIOP Profile Body definition. BIOP defines a Profile Body that is used to construct a unique object reference for each object that is broadcast in the network. The BIOP object references uses the Inter-operable Object Reference (IOR) format defined by the CORBA (Common Object Request Broker Architecture) standard. Each IOR contains a BIOPProfileBody as defined in ISO/IEC 13818-6. It carries all the information pertaining to an object that is needed to uniquely identify the object and locate it within a Service Domain specified by an NSAP address.
- BIOP Message Formats. U-U Object Carousels broadcast the U-U objects in so-called BIOP messages. Each supported U-U object is encoded in a dedicated BIOP message that is built from a generic message format. The BIOP message formats are detailed below.
- BIOP Transport definition. To facilitate access to the U-U objects in broadcast networks, the BIOP messages have to be broadcast repetitively in the broadcast network. The U-U Object Carousel protocol is, therefore, based on the Data Carousel scenario of the U-N Download protocol, which implements the functionality. The BIOP messages are carried in the Modules of the Data Carousel. The Modules are fragmented into Blocks (as defined by U-N Download) and are transported in DownloadDataBlock( ) messages. The associated delivery parameters of the Module (moduleSize, blockSize, Time-outs) are specified in the associated DownloadInfoIndication( ) (DII) messages. The U-U Object Carousel uses the DownloadServerInitiate( ) (DSI) messages of U-N Download to broadcast the IOR of the Service Gateway of the carousel.

DSM-CC BIOP Messages

DSM-CC U-U Object Carousel use four types of U-U Objects: DSM::ServiceGateway, DSM::Directory, DSM::Stream, and DSM::File. Each kind of U-U Object is encoded in a dedicated type of BIOP message. Namely, BIOP defines four messages:

1. ServiceGateway message. The ServiceGateway message is used to convey a U-U object of the type ServiceGateway. It contains references to other Directory, File, Stream, and ServiceGateway objects. There is no more than one ServiceGateway message in one U-U Object Carousel.
2. Directory message. The Directory message is used to convey a U-U object of the type Directory. It contains references to other Directory, File, Stream, and ServiceGateway objects.
3. File message. The file message is used to convey a U-U object of the type File. It contains just the data of the file.
4. Stream message. The Stream message is used to convey a U-U object of the type Stream. It contains a reference to the stream in the broadcast network.

DSM-CC BIOP Generic Message Format

All the four types of BIOP messages are derived from a generic object format, which is used to encapsulate the data and attributes of a single object. The message consists of a header, a sub-header, and a message body. The syntax and semantics of the generic object message format are defined in the ISO/IEC 13818-6 specification and is duplicated below for reference.

TABLE 2

Generic BIOP object message format.

```
Module BIOP {
    typedef unsigned long
ServiceID
    struct ServiceContext {
        ServiceID              context_id;
        sequence<octet, 65535>  context_data;
    };
    struct MessageHeader {
        char                   magic[4];
        Version                biop_version;
        boolean                byte_order;
        octet                  message_type;
        unsigned long          message_size;
    };
    struct MessageSubHeader {
        sequence<octet, 255>   objectKey;
        sequence<octet>        objectKind;
        sequence<octet, 65535> objectInfo;
        sequence<ServiceContext, 255>   serviceContextList;
    };
    struct GenericObjectMessage {
        MessageHeader          messageHeader;
        MessageSubHeader       messageSubHeader;
        sequence<octet>        messageBody;
    };
};
```

The semantics of the fields of the BIOP::MessageHeader are explained as follows:

The magic field identifies the BIOP message. The value of this field is always "BIOP" encoded in ISO Latin-1.

The biop_version field contains the version number of the BIOP protocol used in this message.

The byte_order field indicates the byte ordering used for the following subsequent elements of the message (including message_size). A value of FALSE (0) indicates big-endian byte ordering, and TRUE (1) indicates little-endian ordering.

The message_type field indicates the type of the message. The value of this field shall be set to 0x00. The values in the range from 0x01 to 0xFF are reserved for ISO/IEC 13818-6.

The message$_{13}$ size field contains the length of the message following the message header in bytes. The count includes any alignment gaps that may be introduced by the data encoding standard.

The semantics of the fields BIOP::MessageSubHeader are as follows:

The objectKey field identifies the object that is conveyed in this message. The value of the objectKey is only meaningful to the Broadcast Server and is not interpreted by the Client.

The objectKind field identifies the kind of the object that is conveyed in the message. The value of the objectKind defines the syntax and semantics of the objecctInfo field and the messageBody field.

The objectInfo field contains some or all of the attributes of this object. The syntax and semantics of this field are dependent of the value of the objectKind field.

The serviceContext field contains ORB service data that is passed from the Broadcast Server to the Client. The use of this field is outside the scope of the ISO/IEC 13818-6 specification.

The semantics of the messageBody field are as follows:

The syntax and semantics of the messageBody field are dependent of the value of the objectKind field.

DSM-CC BIOP Directory Message

To instantiate the generic object message format into a dedicated object message, the semantics of the objectInfo and messageBody fields have to be defined. The objectInfo field is intended to carry the attributes of the object, while the messageBody is intended to carry the data of the object. The following rules define the instantiation of the BIOP Directory message:

1. The objectKind field shall contain the string "DSM::Directory" or "dir".

2. The messageBody field shall contain the BIOP::DirectoryMessageBody structure. The syntax and semantics of the BIOP::DirectoryMessageBody are defined below.

The BIOP::DirectoryMessageBody structure consists of a loop of Bindings. A biding correlates an object name (i.e. bindingName) to an IOR and provides additional information about the object. The IOR must include the BIOP Profile Body when the referenced object belongs to the Carousel. The semantics of the BIOP::DirectoryMessageBody are defined below:

The bindingName field (i.e. id and kind) contains the path specification of the object.

The bindingType field indicates the type of the object binding. Binding can either be of type 'nobject' when the name is not bound to a Directory or 'ncontext' when the name is bound to a Directory object. 'composite' is defined for compatibility with the User-to-User Composite bindings.

The objectRef field contains the IOR of the object.

The objectInfo field may contain some of the attributes of the bound object as well as user private information about the object. If attributes of the bound object are carried in this field they shall be the first structures that are encapsulated in this field.

TABLE 3

BIOP::DirectoryMessageBody structure format.

```
Module BIOP {
    typedef string<255>           Istring;
    struct NameComponent {
        Istring                   id;
        Istring                   kind;
    };
    typedef                       Name;
    sequence<NameComponent, 255>
    typedef octet                 BindingType;
```

TABLE 3-continued

BIOP::DirectoryMessageBody structure format.

```
    const BindingType             nobject =1;
    const BindingType             ncontext =2;
    const BindingType             composite =3;
    struct Binding {
        Name                      bindingName;
        Octet                     bindingType;
        IOP::IOR                  objectRef;
        Sequence <octet, 65535>   objectInfo;
    };
    typedef sequence <Binding,    DirectoryMessageBody;
    65535>
};
```

DSM-CC BIOP File Message

The BIOP File message is an instantiation of the generic object message format. The following rules define this instantiation about the object:

1. The objectKind field shall contain the string "DSM::File" or "fil".

2. The messageBody field shall contain the BIOP::FileMessageBody structure. The syntax and semantics of the BIOP::FileMessageBody are defined below. The FileMessageBody field in the table contains the file data as an octet stream.

TABLE 4

BIOP File message format.

```
Module BIOP {
    typedef sequence<octet>       FileMessageBody;
};
```

DSM-CC BIOP Stream Message

The BIOP Stream message is an instantiation of the generic object message format. The following rules define this instantiation:

1. The objectKind field contains the string "DSM::Stream" or "str".

2. The messageBody field contains the BIOP::StreamMessageBody structure. The syntax and semantics of the BIOP::StreamMessageBody are defined below.

TABLE 5

BIOP stream format.

```
Module BIOP {
    struct StreamMessageBody {
        sequence <Tap, 255>       stream;
    };
};
```

The BIOP::StreamMessageBody consists a sequence of Taps that are associated with the stream object. Tap is a structure which BIOP use to achieve network independence. A Tap is basically a reference to a particular network connection by an association tag. The stream field contains one or more Taps associated with the stream object.

DSM-CC BIOP Service Gateway Message

The BIOP Service Gateway message is an instantiation of the generic object format. The following rules define this instantiation:

1. The objectKind field shall contain the string "DSM::ServiceGateway" or "srg".

2. The messageBody field shall contain the BIOP::DirectoryMessageBody structure as described in Table 3.

Summary of DSM-CC BIOP Messages

Figure 5:
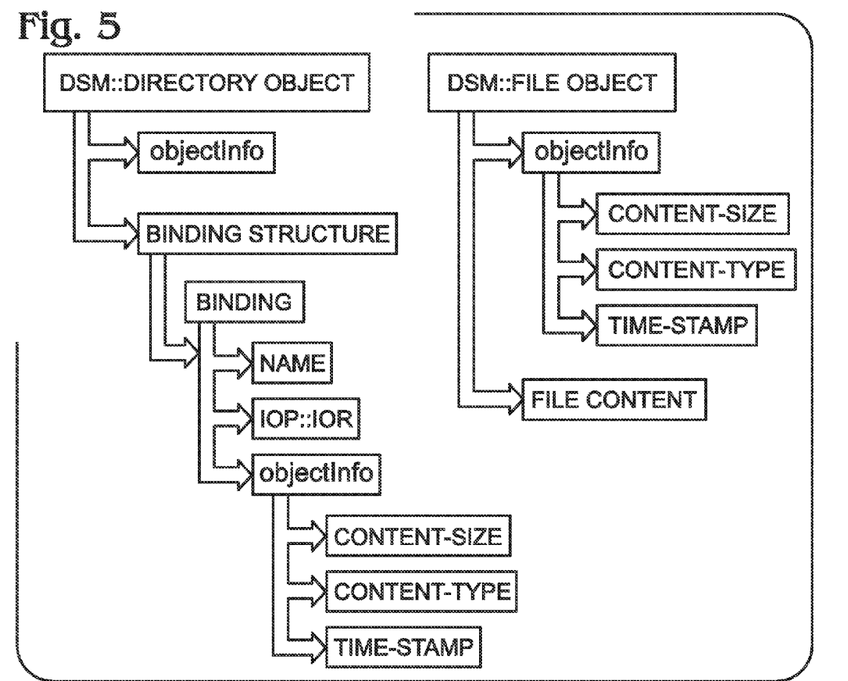
FIG. 5 is a diagram illustrating BIOP directories and files.

FIG. 5 is a diagram illustrating BIOP directories and files. DSM::Directory and DSM::File are shown in FIG. 5 as an example. Each BIOP object has its unique object key and type information (directory, file, stream, or service gateway) in the header. It also has an additional objectInfo structure giving information such as file size, content-type (MIME type), time stamp, etc, depends on the type of the BIOP object. The body of a DSM::File object is the file content. The body of a DSM::Directory object consists of a list of bindings. As explained above, a binding contains a binding name, the object type of the referenced object (directory, file, stream, or service gateway), and an IOR, which gives the location of the referenced object.

A special note about the DSM::ServiceGateway object, it is similar to DSM::Directory object. The difference is simply in the syntax of the binding name. For a DSM::ServiceGateway object, a name is always a base URI; while for a DSM::Directory object a name is a relative path. Each U-U Object Carousel has exactly one Service Gateway object that serves as the top-level directory of the DSM-CC U-U Object Carousel. Objects in the DSM-CC U-U Object Carousel can be reached by following a directory path, i.e. a sequence of directory links, starting from the Service Gateway. An object in a DSM-CC U-U Object Carousel may be referenced from multiple directories, so there may be multiple paths from the Service Gateway to an object.

Transport File System Using DSM-CC U-U Object Carousel

Figure 6:
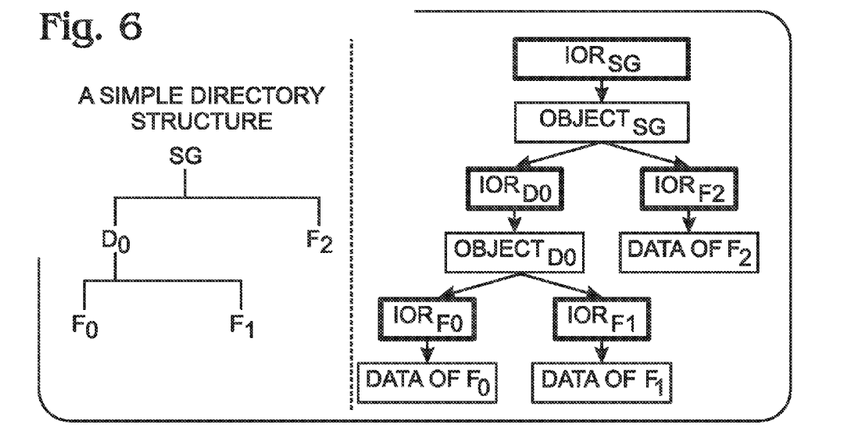
FIG. 6 is a diagram illustrating Object Acquisition in a Simple Directory Structure.

FIG. 6 is a diagram illustrating Object Acquisition in a Simple Directory Structure. A broadcasting transport file system can be built based upon the DSM-CC U-U Object Carousel protocol. FIG. 6 illustrates an example of such as file system, and the sequence for acquiring all the objects in a DSM-CC U-U Object Carousel with a simple hierarchical directory structure. Firstly, the IOR of the Service Gateway object is extracted from the DSI message. Given the IOR for the Service Gateway, the Service Gateway object can be parsed from the data module carrying it. From the binding structure inside the Service Gateway object, the IORs for Directory object D0 and File object F2 can be extracted. Given the IOR for F2, the file data for F2 can be acquired from the data module carrying the F2 object. Given the IOR for D0, Directory object D0 can be extracted, from which the IORs for F0 and F1 can be obtained. Similarly, given the IOR for F0 and the IOR for F1, the file data for F0 and F1 can be acquired. Thus, the IORs for objects in the directory structure are acquired in the following sequence: IOR-SG, IOR-D0, IOR-F2, IOR-F0 and IOR-F1. Once an IOR of an object is obtained, the object can then be retrieved from the corresponding data module.

Note that objects of a DSM-CC U-U Object Carousel are usually carried in a single virtual channel. However, it is possible to have bindings that contain references to objects in other DSM-CC U-U Object Carousel that may be in the same or a different virtual channel. When the DSM-CC U-U Object Carousel resides in a different virtual channel, it may or may not be in the same transport stream. Thus, the logical name space of a DSM-CC U-U Object Carousel may span multiple virtual channels and even multiple transport streams. An IOR, which references an object in a different DSM-CC U-U Object Carousel, should identify the DSM-CC U-U Object Carousel containing the object and give the directory path in that DSM-CC U-U Object Carousel that leads from the Service Gateway of that DSM-CC U-U Object Carousel to the object.

In real practice, the receiver may choose to cache all or part the directory and file objects in its local storage and set up (URI) indexes to the objects. Then the acquisition of any object can be achieved very quickly from the local memory, without going through the DSM-CC U-U Object Carousel in the broadcasting transport.

Delivering MPEG-4 Data in an MPEG-2 Broadcast Network

In the following paragraphs, the use of a Universal (or Uniform) Resource Identifier (URI) is described, for the binding names of the U-U Objects. With an appropriate URI scheme and the U-U Object Carousels, a mechanism can be built for delivering MPEG-4 data in a MPEG-2 broadcasting network.

URI, as defined in RFC2396, is a simple, unified and extensible mechanism for identifying a resource. URI is a generic form (superset) of Universal Resource Locator (URL). It is not limited to the existing Internet protocols and can be expanded with new access technology. The ISO/IEC 13818-1 specification uses URL as an alternative, yet undefined, approach for referencing MPEG-4 data elements. This invention expands the URL concept to a more generic URI format for an access framework and broader scope of data reference.

A particular URI called Local Identifier (lid:) is used in this invention. The lid URI scheme, as defined in SMPTE 343M-2002, is designed for identifying resources, e.g. HTML pages and graphics files, which are transmitted through unidirectional means such as television broadcast. By using the lid scheme in the invention, resources, such as MPEG-4 scenes and associated streams, are transmitted and identified in the unidirectional broadcasting channel. There is no need for a return channel to access the resources remotely such as over the Internet. When resolving a lid reference, the receiver may first look for the resource in cache (if cache is used in the receiver). If it is not found, the receiver can just report the resource is not available, or it can wait for the resource to appear in the broadcast stream. The receiver can time out and report the resource is not available, if the resource does not appear after some period of time.

Figure 7:
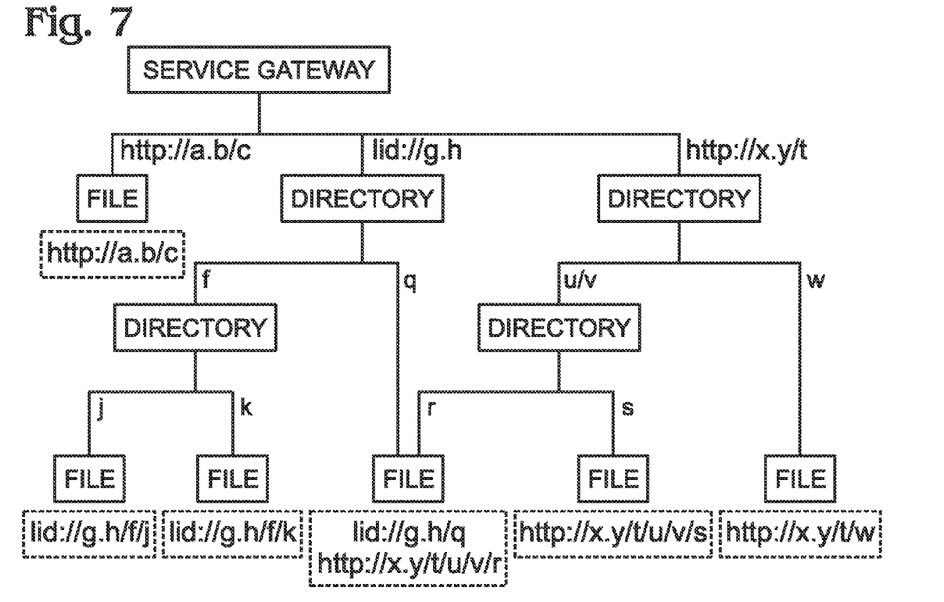
FIG. 7 is a diagram depicting the carriage of MPEG-4 data in an MPEG-2 using U-U OC and URI.

FIG. 7 is a diagram depicting the carriage of MPEG-4 data in an MPEG-2 using U-U OC and URI. With the DSM-CC U-U Object Carousel as the transport protocol, and the lid URI to provide the binding name and access scheme of the U-U objects, a mechanism is available for the carriage MPEG-4 data in an MPEG-2 broadcasting network. An example of integrating the lid URI with DSM-CC U-U Object Carousel is shown in FIG. 7. A Service Gateway object is shown that contains a list of bindings of absolute URI addresses starting with lid or http schemes. The binding name is shown next to each directory link. The resulting URI associated with each file is shown below the file, which in the present invention is the MPEG-4 data transmitted over the MPEG-2 network.

Note that the lid URI is the major scheme for referencing resources in the transport. However, other URI schemes, such as the http scheme, may be used in the present invention framework. As shown in FIG. 7, some URI addresses use the http scheme. DCM-CC Object Carousel only requires the binding name of a DSM::ServiceGateway object to be a base (absolute) URI. The base URI can be either a lid or an http, or other possible URI schemes. However, there is some differences in the use and resolution of different URI schemes. A lid URI is used to label a broadcast resource when it is only available in the broadcast stream. An http URI is used to label a broadcast resource when it is also available on a web server. Note that a resource, such as an MPEG-4 stream, can be referenced by multiple URIs, such as http, lid, etc. Meanwhile, a receiver with limited cache space and an Internet connection may cache resources labeled with a lid URI, but not cache resources labeled with an http URI.

Compatibility of the Invention with the ISO/IEC 13818-1 Defined 4on2 Method

As mentioned previously, ISO/IEC specifies the method for carriage of MPEG-4 content on MPEG-2 transport stream (known as 4on2) in the specification of ISO/IEC 13818-1. The specification (ISO/IEC 13818-1) requires that each of the MPEG-4 streams be contained in an SL-packetized stream and optionally be multiplexed into a FlexMux stream, both defined in ISO/IEC 14496-1. The SL-packetized streams or FlexMux streams are then encapsulated either in MPEG-2 Packetized Elementary Stream (PES) packets or in ISO_IEC_14496_sections, and then encapsulated into MPEG-2 Transport Stream packets. For the MPEG-4 elements, such as streams and/or descriptors, that are not transmitted based on the above-mentioned approach, the specification (ISO/IEC 13818-1) gives an alternative (undefined) approach based on URL reference. The present invention labels these MPEG-4 elements with URI, accessed by Local Identifier (Lid:), and transmits the data by DSM-CC Object Carousels. DSM-CC Object Carousel is also based on the MPEG-2 transport stream. Therefore, MPEG-4 data transmitted by either approach, 4on2 or the present invention method, is carried in the MPEG-2 transport. The two approaches are compatible and can be used simultaneously. In real practice, user has the flexibility to decide the transmitting approach based on the nature of the data.

For MPEG-4 program elements of significant size, or of a continuous nature, such as the broadcasting audio and video data, it may be more effective to packetize the data and continuously transmit (stream) the packets following the original ISO/IEC approach. For other type of program elements that are of limited file sizes or do not require the content to be updated frequently, the present invented approach work may be more effect.

To summarize, the present invention approach enables the following MPEG-4 delivery scenarios in a MPEG-2 network:

- Resources may be delivered in the MPEG-2 transport packets of a PID, and be referenced by the associated ES_ID of the PID (original ISO/IEC 13818-1 defined 4on2 approach).
- Resources may be labeled with an URI such as an http address and accessed over the Internet.
- Resources may be labeled with an URI and delivered by DSM-CC U-U Object Carousel. Resources may be delivered in the same or a different DSM-CC U-U Object Carousel in the same virtual channel, or delivered in a DSM-CC U-U Object Carousel of a different virtual channel. When the resources are delivered in a different virtual channel, they may be transmitted in a different transport.
- Resources may be stored or cached in the memory and accessed by URI schemes.

Figure 8:
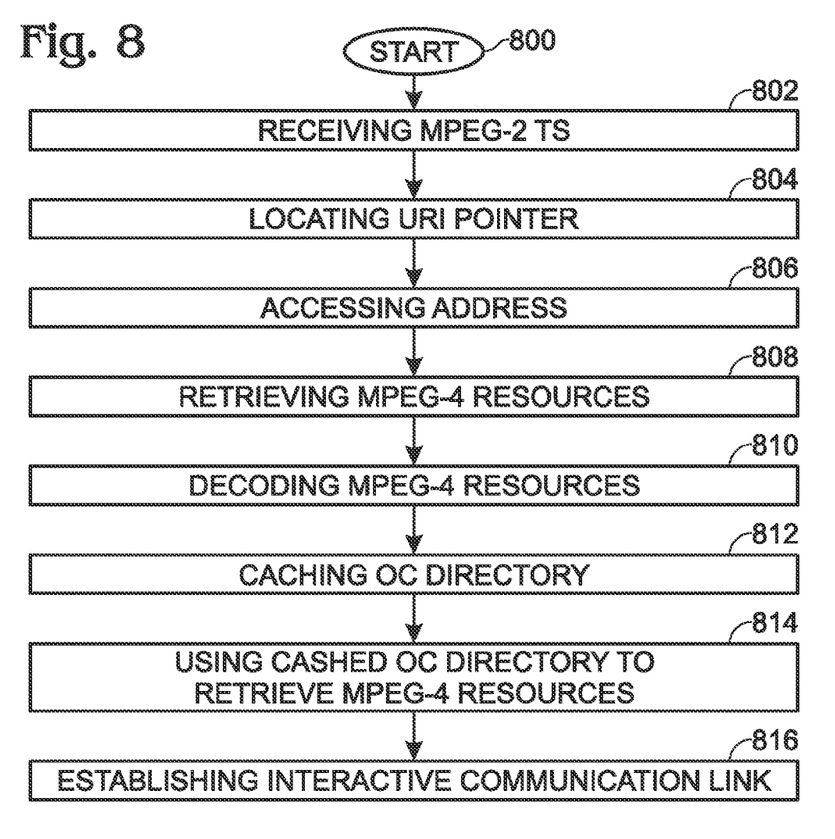
FIG. 8 is a flowchart of the present invention URI pointer method for the receiving MPEG-4 data pointers in an MPEG-2 TS.

FIG. 8 is a flowchart of the present invention URI pointer method for the receiving MPEG-4 data pointers in an MPEG-2 TS. Although the method is depicted as a sequence of numbered steps for clarity, no order should be inferred from the numbering unless explicitly stated. It should be understood that some of these steps may be skipped, performed in parallel, or performed without the requirement of maintaining a strict order of sequence. The method starts at Step 800.

Step 802 receives an MPEG-2 TS. Step 804 locates a URI in the TS. Step 806, in response to the URI, accesses an address. Step 808, in response to accessing the address, retrieves MPEG-4 resources. The MPEG-4 resources may be resources such as audio, video, and/or systems data. Step 810 decodes the MPEG-4 resources. Decoding the MPEG-4 resources may result in the enhancing audio data in the MPEG-2 TS, enhancing video data in the MPEG-2 TS, and/or using the systems data to establish an interactive audiovisual scene and communication link.

In some aspects of the method, locating a URI in the TS (Step 804) includes locating a URI selected from the group including a local cache address, a Web protocol identifier (such as ftp or http), and a local identifier (lid).

In one aspect, Step 802 receives an MPEG-2 TS embedded with MPEG-4 resources, and using a URI pointer in Step 804 includes using lid URIs retrieved from the MPEG-2 TS. Then, Step 808 includes retrieving MPEG-4 resources from the MPEG-2 TS. In other aspects, Step 802 receiving an MPEG-2 TS with MPEG-4 resources organized in Object Carousal (OC) system. More specifically, an OC transport protocol is used. Then, Step 804 uses lid URIs to provide a binding name and access scheme to the objects in the OC.

For example, Step 804 may use a lid URI embedded in an Initial Object Descriptor (IOD) to locate resources in the OC such as a BIFS scene description stream and/or an object descriptor stream. Typically, the OC transport protocol of Step 802 can be described as a hierarchical directory structure that may include a root directory, sub-directories, files, and streams.

In other example, Step 802 receives a first MPEG-2 TS and a second MPEG-2 TS, and Step 804 retrieves a lid URI in the first MPEG-2 TS. Then, retrieving MPEG-4 resources in response to accessing the lid URI (Step 808) includes retrieving MPEG-4 resources from the second MPEG-2 TS.

Some aspects of the method include further steps. Step 812 caches the OC hierarchical directory. Step 814 uses the cached OC hierarchical directory to retrieve MPEG-4 resources. Step 816 establishes an interactive audiovisual scene and communication link in response to decoding the MPEG-4 systems data.

Figure 9:
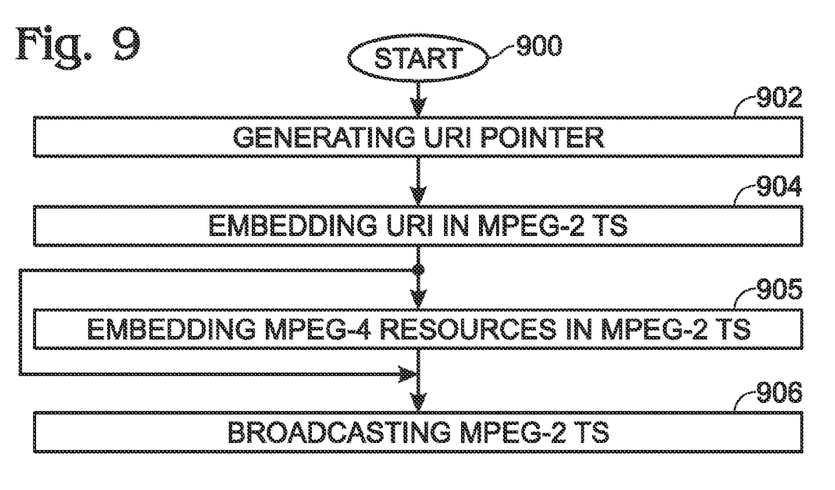
FIG. 9 is a flowchart illustrating the present invention URI pointer method for broadcasting pointers to MPEG-4 data in an MPEG-2 TS.

FIG. 9 is a flowchart illustrating the present invention URI pointer method for broadcasting pointers to MPEG-4 data in an MPEG-2 TS. The method starts at Step 900. Step 902 generates a URI for accessing MPEG-4 resources located at an address. Step 904 embeds the URI in an MPEG-2 TS. Step 906 broadcasts the MPEG-2 TS. Step 902 typically includes generating a URI such as a local (receiver) cache address, a Web protocol identifier, such as ftp or http, or a local identifier (lid).

In some aspects of the method, Step 905 embeds MPEG-4 resources in the MPEG-2 TS. Then, generating a URI in Step 902 includes using a lid URI for accessing the MPEG-4 resources in the MPEG-2 TS. More specifically, Step 905 may organize MPEG-4 resources in an Object Carousal (OC) transport protocol. Then, Step 902 uses lid URIs to provide a binding name and access scheme to the objects in the OC.

For example, using lid URIs to provide a binding name and access scheme to the objects in the OC in Step 902 may include using a lid URI embedded in an IOD to locate resources in the OC such as a BIFS scene description stream or an object descriptor stream. The OC transport protocol described by Step 902 can be a hierarchical directory structure including a root directory, sub-directories, files, and streams.

In another example, generating a URI for accessing MPEG-4 resources in Step 902 includes locating a lid URI in a first MPEG-2 TS, and embedding MPEG-4 resources in the MPEG-2 TS (Step 905) includes embedding MPEG-4 resources in a second MPEG-2 TS. Then, broadcasting the MPEG-2 TS in Step 906 includes broadcasting the first and second MPEG-2 TSs.

In some aspects, generating a URI for accessing MPEG-4 resources located at an address in Step 902 includes accessing MPEG-4 resources such as audio, video, or systems data. That is, the MPEG-4 resources may be used to enhance audio data in the MPEG-2 TS, enhance video data in the MPEG-2 TS, and/or use the systems data for the establishment of an interactive audiovisual scene and communication link.

Systems and methods have been provided for using a URI, embedded in an MPEG-2 TS, to access MPEG-4 resources. A few examples have been given of how the URIs can be used, but these examples are not an exhaustive list. Likewise, examples have been given for MPEG-4 resource locations, but other locations are possible. Other variations and embodiments will occur to those skilled in the art.

I claim:

1. A uniform resource indictor (URI) pointer method for the retrieving Moving Picture Experts Group 4 (MPEG-4) data pointers in a Moving Picture Experts Group 2 (MPEG-2) transport stream (TS), the method comprising:
   receiving an MPEG-2 TS embedded with MPEG-4 resources organized in Object Carousal (OC) transport protocol;
   locating a URI in the TS using a local identifier (lid) retrieved from the MPEG-2 TS;
   retrieving MPEG-4 resources from the MPEG-2 TS using lid URIs to provide a binding name and access scheme to the objects in the OC; and,
   decoding the MPEG-4 resources.

2. The method of claim 1 wherein using lid URIs to provide a binding name and access scheme to the objects in the OC includes using a lid URI embedded in an Initial Object Descriptor (IOD) to locate resources in the OC selected from the group including a Binary Format for Scenes (BIFS) scene description stream and an object descriptor stream.

3. The method of claim 1 wherein using an OC transport protocol includes forming a hierarchical directory structure.

4. The method of claim 3 wherein forming a hierarchical directory structure includes forming a hierarchical directory structure including a root directory, sub-directories, files, and streams.

5. The method of claim 1 wherein receiving an MPEG-2 TS includes receiving a first MPEG-2 TS and a second MPEG-2 TS;
   wherein locating a URI in the TS includes retrieving a lid URI in the first MPEG-2 TS; and,
   wherein retrieving MPEG-4 resources in response to accessing the lid URI includes retrieving MPEG-4 resources from the second MPEG-2 TS.

6. The method of claim 1 wherein retrieving MPEG-4 resources in response to accessing the address includes retrieving MPEG-4 resources selected from the group including audio, video, and systems data.

7. The method of claim 1 wherein decoding the MPEG-4 resources includes an action selected from the group including enhancing audio data in the MPEG-2 TS, enhancing video data in the MPEG-2 TS, and using the systems data to establish an interactive audiovisual scene and communication link.

8. The method of claim 3 further comprising:
   caching the OC hierarchical directory.

9. The method of claim 8 further comprising;
   using the cached OC hierarchical directory to retrieve MPEG-4 resources.

10. The method of claim 6 further comprising:
    establishing an interactive audiovisual scene and communication link in response to decoding MPEG-4 systems data.

11. A uniform resource indictor (URI) pointer method for broadcasting pointers to Moving Picture Experts Group 4 (MPEG-4) data in a Moving Picture Experts Group 2 (MPEG-2) transport stream (TS), the method comprising:
    embedding MPEG-4 resources in the MPEG-2 TS, organized in an Object Carousal (OC) transport protocol;
    generating a local identifier (lid) URI for accessing MPEG-4 resources, using the lid URIs to provide a binding name and access scheme to the objects in the OC;
    embedding the URI in an MPEG-2 TS; and,
    broadcasting the MPEG-2 TS.

12. The method of claim 11 wherein using lid URIs to provide a binding name and access scheme to the objects in the OC includes using a lid URI embedded in an Initial Object Descriptor (IOD) to locate resources in the OC selected from the group including a Binary Format for Scenes (BIFS) scene description stream and an object descriptor stream.

13. The method of claim 11 wherein using an OC transport protocol includes forming a hierarchical directory structure.

14. The method of claim 13 wherein forming a hierarchical directory structure includes forming a hierarchical directory structure including a root directory, sub-directories, files, and streams.

15. The method of claim 11 wherein embedding the URI in an MPEG-2 TS includes locating a lid URI in a first MPEG-2 TS;
    wherein embedding MPEG-4 resources in the MPEG-2 TS includes embedding MPEG-4 resources in a second MPEG-2 TS; and,
    wherein broadcasting the MPEG-2 TS includes broadcasting the first and second MPEG-2 TSs.

16. The method of claim 11 wherein generating a URI for accessing MPEG-4 resources located at an address includes accessing MPEG-4 resources selected from the group including audio, video, and systems data.

17. The method of claim 11 wherein generating a URI for accessing MPEG-4 resources includes resources selected from the group including enhanced audio data in the MPEG-2 TS, enhanced video data in the MPEG-2 TS, and systems data for the establishment of an interactive audiovisual scene and communication link.

18. In a receiver for decoding Moving Picture Experts Group 4 (MPEG-4) data, a uniform resource indictor (URI) pointer system for accessing pointers to MPEG-4 data from a Moving Picture Experts Group 2 (MPEG-2) transport stream (TS), the system comprising:
    a receiver having an interface for accepting an MPEG-2 TS with an embedded URI for accessing MPEG-4 resources;
    an address access unit having an interface to accept the MPEG-2 TS from the receiver, the address access unit locating a local identifier (lid) URI in the TS, and retrieving MPEG-4 resources embedded in the MPEG-2 TS organized in Object Carousal (OC) transport protocol by building the OC in a directory and using lid URIs to provide a binding name and access scheme to the objects in the OC; and,
    a decoder having an interface connected to the address access unit for receiving the MPEG-4 resources and supplying decoded the MPEG-4 information.

19. The system of claim 18 wherein the address access unit uses a lid URI embedded in an Initial Object Descriptor (IOD) to locate resources in the OC selected from the group including a Binary Format for Scenes (BIFS) scene description stream and an object descriptor stream.

20. The system of claim 18 wherein the address access unit builds an OC hierarchical directory.

21. The system of claim 20 wherein the address access unit OC hierarchical directory includes a root directory, sub-directories, files, and streams.

22. The system of claim 18 wherein the address access unit receives a first MPEG-2 TS and a second MPEG-2 TS, retrieves a lid URI in the first MPEG-2 TS, and uses the lid URI to retrieve MPEG-4 resources from the second MPEG-2 TS.

23. The system of claim 18 wherein the decoder supplies MPEG-4 resources selected from the group including audio, video, and systems data.

24. The system of claim 18 wherein the decoder supplies resources selected from the group including enhanced audio data in the MPEG-2 TS, enhanced video data in the MPEG-2 TS, and systems data to establish an interactive audiovisual scene and communication link.

25. The system of claim 18 further comprising:
a cache mechanism for storing the OC hierarchical directory.

26. The system of claim 25 wherein the address access unit uses lid URIs to retrieve MPEG-4 resources from the OC hierarchical directory in the cache mechanism.

27. The system of claim 23 further comprising:
a transmitter having an interface to send MPEG-4 information;
an interactive audiovisual scene and communication link, including the transmitter and receiver, formed in response to decoding MPEG-4 systems data, sending and receiving MPEG-4 information.

28. In a Moving Picture Experts Group 4 (MPEG-4) broadcaster, a uniform resource indictor (URI) pointer system for supplying a Moving Picture Experts Group 2 (MPEG-2) transport stream (TS) with URIs for accessing MPEG-4 data, the system comprising:
an encoder having an interface to accept MPEG-4 information and to supply encoded MPEG-4 resources;
an address pointer unit having an interface to accept the encoded MPEG-4 resources, the address pointer embedding the encoded MPEG-4 resources in a MPEG-2 TS using an Object Carousal (OC) transport protocol, generating a local identifier (lid) URI for accessing the MPEG-4 resources in the MPEG-2 TS using lid URIs to provide a binding name and access scheme to the objects in the OC, and having an interface to supply the MPEG-2 TS; and,
a transmitter having an interface to accept the MPEG-2 TS from the address pointer unit and to broadcast the MPEG-2 TS.

29. The system of claim 28 wherein the address pointer unit uses a lid URI embedded in an Initial Object Descriptor (IOD) to locate resources in the OC selected from the group including a Binary Format for Scenes (BIFS) scene description stream and an object descriptor stream.

30. The method of claim 28 wherein the address pointer unit forms an OC system hierarchical directory structure.

31. The system of claim 30 wherein the address pointer forms an OC transport protocol hierarchical directory structure including a root directory, sub-directories, files, and streams.

32. The system of claim 28 wherein the address pointer unit forms a lid URI in a first MPEG-2 TS, and embeds MPEG-4 resources in a second MPEG-2 TS; and,
wherein the transmitter broadcasts the first and second MPEG-2 TSs.

33. The system of claim 28 wherein the address pointer unit generates URIs for MPEG-4 resources selected from the group including audio, video, and systems data.

34. The system of claim 28 wherein the address pointer unit generates URIs for MPEG-4 resources selected from the group including enhanced audio data in the MPEG-2 TS, enhanced video data in the MPEG-2 TS, and systems data for the establishment of an interactive audiovisual scene and communication link.

* * * * *